US005644923A

United States Patent [19]

Moro-Franco

[11] Patent Number: 5,644,923

[45] Date of Patent: Jul. 8, 1997

[54] SYSTEM FOR FILTERING RESIDUAL CONTAMINANT PARTICLES FOR SMOKE AND GAS THROUGH ATOMIZED ULTRAFREEZING

[76] Inventor: Eusebio Moro-Franco, Partida Sol del Horta, s/n° , 12110 Alcora (Castellón), Spain

[21] Appl. No.: 522,253

[22] PCT Filed: Jan. 10, 1995

[86] PCT No.: PCT/ES95/00006

§ 371 Date: Dec. 18, 1995

§ 102(e) Date: Dec. 18, 1995

[87] PCT Pub. No.: WO95/18666

PCT Pub. Date: Jul. 13, 1995

[30] Foreign Application Priority Data

Jan. 11, 1994 [ES] Spain .................................... 9400043

[51] Int. Cl.$^6$ ............................. B01D 8/00; B01D 47/10

[52] U.S. Cl. ............................................... 62/55.5; 62/601

[58] Field of Search ........................... 62/600, 601, 52.1, 62/55.5

[56] References Cited

U.S. PATENT DOCUMENTS

| | | | |
|---|---|---|---|
| 1,307,999 | 6/1919 | Buckley | 62/55.5 X |
| 2,668,424 | 2/1954 | Mueller | 62/55.5 X |
| 2,831,549 | 4/1958 | Alpert | 62/55.5 |
| 2,853,859 | 9/1958 | Thompson | 62/55.5 |
| 3,157,480 | 11/1964 | Van Buekering | 62/55.5 |
| 3,164,320 | 1/1965 | Welbourn | 62/55.5 |
| 3,630,051 | 12/1971 | Martin | 62/55.5 |
| 3,712,074 | 1/1973 | Boissin | 62/55.5 |
| 3,788,096 | 1/1974 | Brilloit | 62/55.5 |
| 4,424,680 | 1/1984 | Rothchild . | |
| 4,555,912 | 12/1985 | Bogosh | 62/55.5 X |
| 4,677,863 | 7/1987 | Gay et al. | 62/55.5 X |
| 4,769,054 | 9/1988 | Steigman | 62/601 |
| 4,786,301 | 11/1988 | Rhodes | 62/92 X |
| 5,072,593 | 12/1991 | Ishigaki | 62/55.5 |
| 5,088,280 | 2/1992 | Scott | 62/52.1 X |
| 5,182,926 | 2/1993 | Carns et al. | 62/601 X |

FOREIGN PATENT DOCUMENTS

| | | |
|---|---|---|
| 1091144 | 12/1980 | Canada . |
| 0314072 | 5/1989 | European Pat. Off. . |
| 3048248 | 7/1982 | Germany . |
| 92/08937 | 5/1992 | WIPO . |

*Primary Examiner*—Christopher Kilner
*Attorney, Agent, or Firm*—Klauber & Jackson

[57] ABSTRACT

A system for filtering contaminants from a gas stream through atomized ultrafreezing including: a housing having an inlet mouth and an outlet mouth; a fluid temperature regulating element disposed within the inlet mouth; a venturi-type valve having a fluid speed regulator disposed downstream of the temperature regulating element; a down pipe disposed downstream of the venturi-type valve; at least one atomized water injector at the inlet of the down pipe which is capable of spraying the contaminated gas stream exiting the venturi-type valve; at least one liquid nitrogen shower element disposed in the down pipe downstream of the water injector which is capable of freezing the water, wherein water containing the contaminant is capable of solidifying into hail and precipitating; and a decanter connected to the outlet of the down pipe having a first separator for removing the hail from the gas stream, a discharge valve at the bottom of the decanter for discharging the hail from the decanter, and a second separator disposed downstream of the first separator and upstream of the outlet mouth for removing the hail from the gas stream. The contaminant may be separated from the hail by ultrasound. In a second embodiment, the liquid nitrogen shower element is replaced by a liquid nitrogen filled coil disposed around the down pipe and at least part of the decanter.

8 Claims, 2 Drawing Sheets

SYSTEM FOR FILTERING RESIDUAL CONTAMINANT PARTICLES FOR SMOKE AND GAS THROUGH ATOMIZED ULTRAFREEZING

OBJECT OF THE INVENTION

As expressed in the title of this specification, the present invention refers to a system for filtering residual contaminant particles for smoke and gas through atomized ultrafreezing, which proves to be a very efficient and low cost system in comparison with other conventional ones that carry out the same function.

It advantageously avoids contaminant particles and gas from coming out to the outside, without thus producing "acid rain", which seriously harms plants.

On the other hand, this system of the invention allows some elements of the residual product to be recovered.

BACKGROUND OF THE INVENTION

Presently, different systems to purify gas and smoke consisting of water baths or baths of other liquids that act as a filter for the products tc be purified are known.

The efficiency of said systems is not as good as would be expected, whereas the cost of the assembly and installation thereof is very high. Besides, the purification is not totally correct, which implies that some contaminant elements come out to the outside after purification.

DESCRIPTION OF THE INVENTION

To overcome the above mentioned problems, the invention proposes a system for filtering residual contaminant particles for smoke and gas through atomized ultrafreezing, mainly preventing the contaminant elements that cause the so-called "acid rain" from being expelled to the atmosphere. Another important feature is that the cost of assembly and installation of the unit is relatively inexpensive. In short, it is a very efficient system.

The smoke to be purified passes first of all through a top inlet mouth and then continues until it reaches a Venturi-type valve, that regulates the speed of the smoke or gas, that then passes through a group of sprayed or atomized water injectors, then forming a fine rain, which is then ultrafreezed by the action of two liquid nitrogen showers, which will cause an advantageous solidification of the fine rain into a hail-like mass, which then precipitates to a bottom decanter. The decanter includes two separators, one which retains the precipitated hail that later comes out through a discharge valveand a second slower separator inserted before the outlet mouth or chimney, through which the totally purified air is expelled to the atmosphere.

On the other hand, for the purpose of reducing the liquid nitrogen consumption and as a second embodiment, replacement of the showers of this gas by a coil protected bv a suitable insulating material is provided for, at the same time that it will be placed outside over the decantation duct, said coil occupying part of the bottom decanter.

Depending on the temperature of the fluid (smoke or gas) to be purified, inclusion of a heat exchanger when it is necessary to reduce the temperature of the fluid or a condenser when it is necessary to increase said temperature in the inlet mouth has been provided for. This particular fact is important, since in order to attain total efficiency of the system, it is necessary for the fluid to be at the most suitable temperature upon entering the system.

Depending on the type of fluid to be purified, there is the possibility of using or not using atomized water injectors.

Hereinafter to provide a better understanding of this specification and forming an integral part of the same, a series of figures wherein the object of the invention has been represented in an illustrative and non-restrictive manner is attached hereto.

DESCRIPTION OF THE PREFERRED EMBODIMENT

Figure 1:
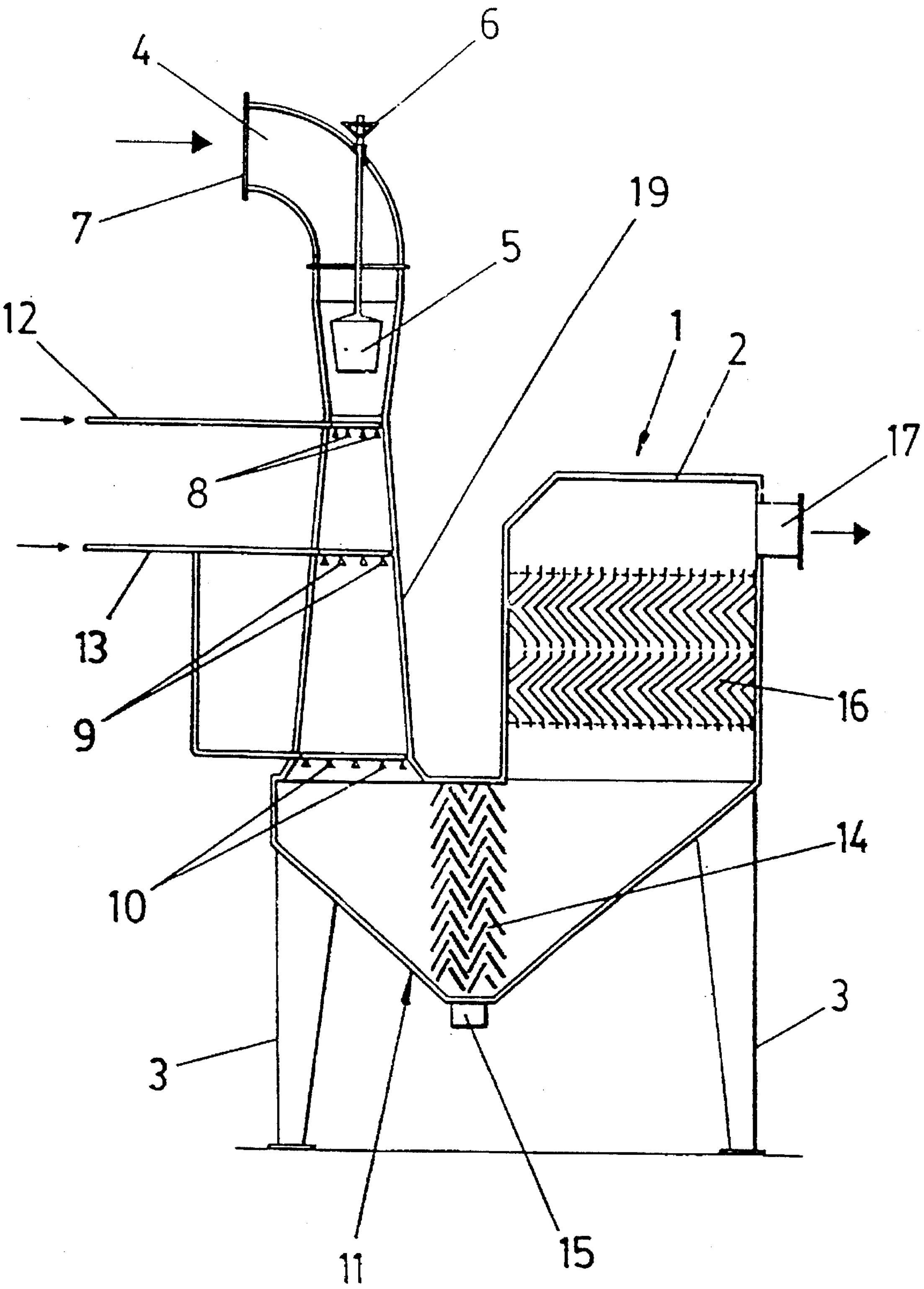
FIG. 1 is a schematic view of the entire system for filtering residual contaminant particles for smoke and gas through atomized ultrafreezing, object of the invention. Among other elements, it includes some liquid nitrogen showers to solidify the contaminant products.

Referring to the numbering used in FIG. 1, the system for filtering residual contaminant particles for smoke and gas through atomized ultrafreezing is defined by a filter supported by a housing (1) whose entire surface is provided with an insulating material (2), at the same time that it rests on some legs (3). In principle, the filter has a top inlet mouth (4) through which the contaminant fluid which is to be completely purified passes, such as smoke or gas, which then reach a Venturi-type valve, provided with a regulator (6) to vary the speed of the contaminant fluid. The incorporation of a fluid temperature regulator (7), such as a heat exchanger to reduce the temperature or a condenser to prevent liquation, in the inlet mouth (4) has been provided for. This regulator element (7) is important, since the same keeps the temperature of the contaminant fluid at the suitable degrees when it passes through the inlet mouth (4), thus achieving in subsequent stages of the process, a correct and efficient purification.

Continuing the process and the flow of fluid, the latter will pass from the Venturi valve (5) propelled by the valve to a group of atomized or sprayed water injectors (8), thus forming a fine rain, which will then solidify, in the form of hail, by the action of two liquid nitrogen showers (9) and (10), said hail then precipitating to a bottom decanter (11). The water that feeds the injectors (8) comes from an outside duct (12). The nitrogen that feeds the two showers (9) and (10) also comes from another outside duct (13). Hence, the decanter (11) incorporates a first separator (14) that retains the precipitated hail that later comes out through a discharge valve (15); on the other hand, incorporating a slower second separator (16), which is inserted outside before the outlet mouth (17) or chimney, through which the totally purified fluid is expelled to the atmosphere.

On the other hand, cleaning by ultrasound takes place in the decanter (11) which permits the contaminant elements to be separated from the hail-like mass, in such a way that these contaminant elements will come out solidified through the discharge valve (15), at the same time that the same, in some cases, include residue capable of being recycled.

The separator (16) that is close to the outlet mouth (17) can also be called a drop separator, since the hail that has been previously cellected by the first separator (14) practically does not reach the same.

Figure 2:
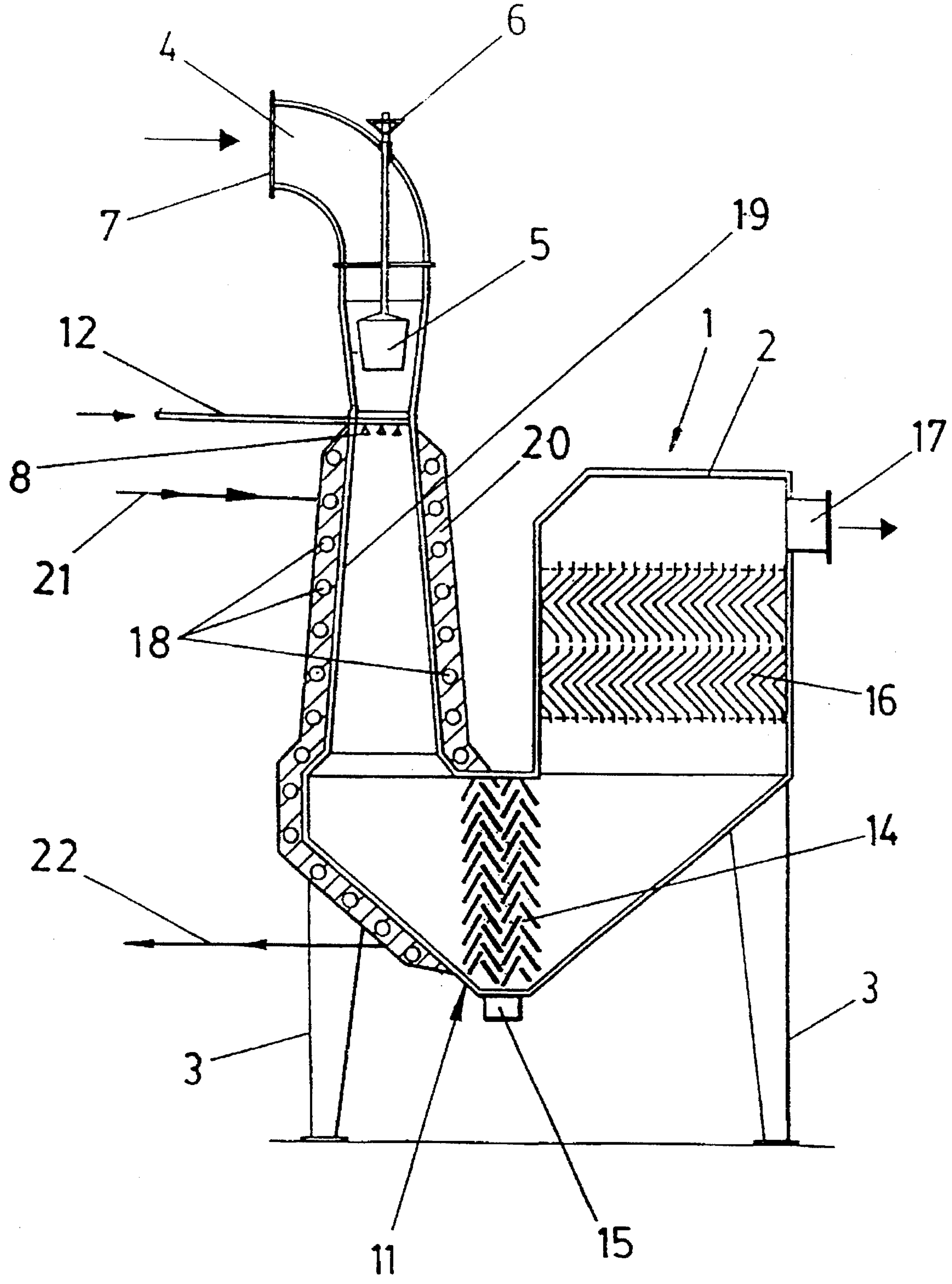
FIG. 2 is a view similar to the previous one, wherein the liquid nitrogen showers have been replaced by an outside coil through which said liquid nitrogen flows in order to condense or freeze the contaminant products.

In FIG. 2, the liquid nitrogen showers (9) and (10) have been advantageously replaced bv the outside coil (18) thereof coupled around the dcwn pipe (19) where said showers (9) and (10) were located, this coil occupying part of the bottom decanter (11). The outside coil (18) through which the liouid nitrogen will flow closed-circuit, is covered by a suitable insulating material (20), at the same time that it has an inlet duct (21) and another outlet duct (22). With this arrangement, cooling is caused by said outside coil (18) over the down pipe (19) and part of the bottom decanter (11). Depending on the cooling efficiency, the contaminated fluid can be condensed or frozen, as is done with the atomized nitrogen when it flows through the showers (9) and (10).

The consumption of liquid nitrogen is reduced considerably upon using the outside coil (18), at the same time that the liquid nitrogen will not mix with the contaminated fluid as in the case of the nitrogen showers (9) and (10); therefore, subsequent separation thereof will not be necessary.

On the other hand, it is possible to eliminate the atomized water injectors (8) or not to use them when we filter the contaminated products, wherein the physical characteristics thereof allow only condensation; producing afterwards the liquefaction filtering process and decanting towards the separators (14) and (16).

I claim:

1. A system for filtering residual contaminant particles from a gas stream through atomized ultrafreezing comprising:

a housing having an inlet mouth and an outlet mouth; and a separator means, disposed in said housing, including:

a fluid temperature regulating element disposed within said inlet mouth;

a venturi-type valve having a fluid speed regulator disposed downstream of said temperature regulating element;

a down pipe disposed downstream of said venturi-type valve;

at least one atomized water injector at the inlet of said down pipe which is capable of spraying the gas stream exiting said venturi-type valve with water;

at least one liquid nitrogen shower element disposed in said down pipe downstream of said water injector which is capable of freezing the water, wherein water containing contaminant particles is capable of solidifying into hail and precipitating;

a decanter connected to the outlet of said down pipe having:

a first separator for removing the hail from the gas stream;

a discharge valve at the bottom of said decanter for discharging the hail from the separator means; and a second separator disposed downstream of said first separator and upstream of said outlet mouth for removing the hail from the gas stream; and means for separating the contaminant from the hail by ultrasound, said means being disposed at the bottom of said decanter.

2. The system according to claim 1 wherein said outlet mouth further comprises a chimney.

3. A system for filtering residual contaminant particles from a gas stream through atomized ultrafreezing comprising:

a housing having an inlet mouth and an outlet mouth; and a separator means, disposed in said housing, including:

a fluid temperature regulating element disposed within said inlet mouth;

a venturi-type valve having a fluid speed regulator disposed downstream of said temperature regulating element;

a down pipe disposed downstream of said venturi-type valve;

at least one atomized water injector at the inlet of said down pipe which is capable of spraying the gas stream exiting said venturi-type valve with water;

a coil adapted for the flow of liquid nitrogen therein and attached to an outside surface of said down pipe for freezing the water, wherein the water containing contaminant particles is capable of solidifying into hail and precipitating;

insulation disposed over said coil;

a decanter connected to the outlet of said down pipe having:

a first separator for removing the hail from the gas stream;

a discharge valve at the bottom of said decanter for discharging the hail collected from the separator means; and a second separator disposed downstream of said first separator and upstream of said outlet mouth for removing the hail from the gas stream, wherein said coil is disposed over at least part of said decanter; and means for separating the cotaminant from the hail by ultrasound, said means being disposed at the bottom of said decanter.

4. The system according to claim 3 wherein said outlet mouth further comprises a chimney.

5. A system for filtering a gas stream, which is contaminated with at least one contaminant, by atomized ultrafreezing, the system comprising:

a housing having:

an inlet portion including an inlet mouth for receiving the contaminated gas stream;

a venturi portion attached to said inlet portion;

a down pipe attached to said venturi portion;

a hopper attached to said down pipe; and an outlet portion attached to said hopper and having an outlet mouth;

a fluid temperature regulating element disposed within said inlet portion at said inlet mouth for adjusting the temperature of the contaminated gas stream passing through said inlet portion;

a venturi-type valve disposed downstream of said temperature regulating element in said venturi portion and having a fluid speed regulator;

at least one atomized water injector at the inlet of said down pipe which is capable of spraying the contaminated gas stream exiting said venturi-type valve with water, whereby the water droplets combine with the contaminant;

means of freezing the water droplets within said down pipe, wherein the water droplets are capable of solidifying into hail;

a first separator disposed in said hopper for removing the hail from the gas stream;

a discharge valve disposed at the bottom of said hopper for discharging the hail from said hopper; and a second separator disposed in said hopper downstream of said first separator and upstream of said outlet mouth for removing the hail from the gas stream;

wherein the hail precipitates to the bottom of said hopper.

6. The system according to claim 5 further comprising means for separating the contaminant from the hail by ultrasound, said means being disposed at the bottom of said hopper.

7. The system according to claim 5 wherein said means of freezing the water droplets further comprises at least one liquid nitrogen shower element disposed in said down pipe downstream of said water injector.

8. The system according to claim 5 wherein said means of freezing the water droplets further comprises:

a coil which is capable of liquid nitrogen flow therein, said coil being attached to an outside surface of said down pipe and at least part of said hopper; and insulation disposed over said coil.

* * * * *

UNITED STATES PATENT AND TRADEMARK OFFICE

CERTIFICATE OF CORRECTION

PATENT NO. : 5,644,923

DATED : July 8, 1997

INVENTOR(S) : Eusebio Moro-Franco

It is certified that error appears in the above-indentified patent and that said Letters Patent is hereby corrected as shown below:

IN THE TITLE:

After "CONTAMINANT PARTICLES", Please change "FOR SMOKE" to read --FROM SMOKE--.

Signed and Sealed this

Twenty-fifth Day of November, 1997

Attest:

BRUCE LEHMAN

*Attesting Officer*

*Commissioner of Patents and Trademarks*